July 11, 1944.  H. S. YOUNG, JR  2,353,535

SAFETY DEVICE

Filed Oct. 23, 1941

INVENTOR.
HENRY S. YOUNG, JR.
BY C. H. Fowler
ATTORNEY

Patented July 11, 1944

2,353,535

UNITED STATES PATENT OFFICE 2,353,535

SAFETY DEVICE

Henry S. Young, Jr., Detroit, Mich., assignor to Hydraulic Brake Company, Detroit, Mich., a corporation of California Application October 23, 1941, Serial No. 416,257

10 Claims. (Cl. 303—84)

This invention relates to safety devices for fluid pressure braking systems for motor vehicles.

The invention comprehends the installation within a fluid pressure braking system of a safety device comprising a housing having a fluid inlet port and fluid outlet ports to the brake line, and means for automatically closing the outlet port connected to a ruptured line, so that when one of the brake lines becomes ruptured the other brake line will not be rendered inoperative. Said means also functions to maintain the port connected to the ruptured line closed after the pressure on the fluid has been released.

An object of the invention is to provide a safety device including a housing having an inlet port and outlet ports, and a member within the housing swingable to automatically close off either of said outlet ports. More particularly the swingable member is provided with means for maintaining either of the ports closed following movement of said member closing such port.

Another object of the invention is to provide a safety device including a housing having an inlet port and outlet ports, a pivoted vane in the housing automatically operative to close off either of the outlet ports because of a differential in fluid pressure acting on the opposite sides of the vane, means for normally maintaining the vane centrally of the outlet ports, and spring-tensioned means operative upon movement of the vane to close off one of the outlet ports and to maintain the port closed until a resetting of the vane is made manually.

More specifically, the vane is provided with a spring-pressed ball mounted therein for normally maintaining the vane between the outlet ports. Said ball is adapted, upon movement of the vane in response to variation in pressure, to seat in one of the outlet ports and remain therein, closing the port until the vane is readjusted.

A further object of the invention is to provide in a fluid pressure braking system a safety device comprising a chamber having an inlet port and outlet ports, and provided with a partition element shiftably supported within the chamber and having means normally maintaining it at a position intermediate the outlet ports but releasable under differential pressure on opposite sides of the partition member to permit shifting of the member to close either outlet port.

A feature of the invention is to provide a safety device including means for indicating upon a failure of a brake line the particular brake line that has failed, and manual means for readjusting the safety device after the ruptured line has been repaired.

Other objects and advantages of the invention will appear from the following description taken in connection with the accompanying drawing forming a part of this specification, and in which—

Figure 1:
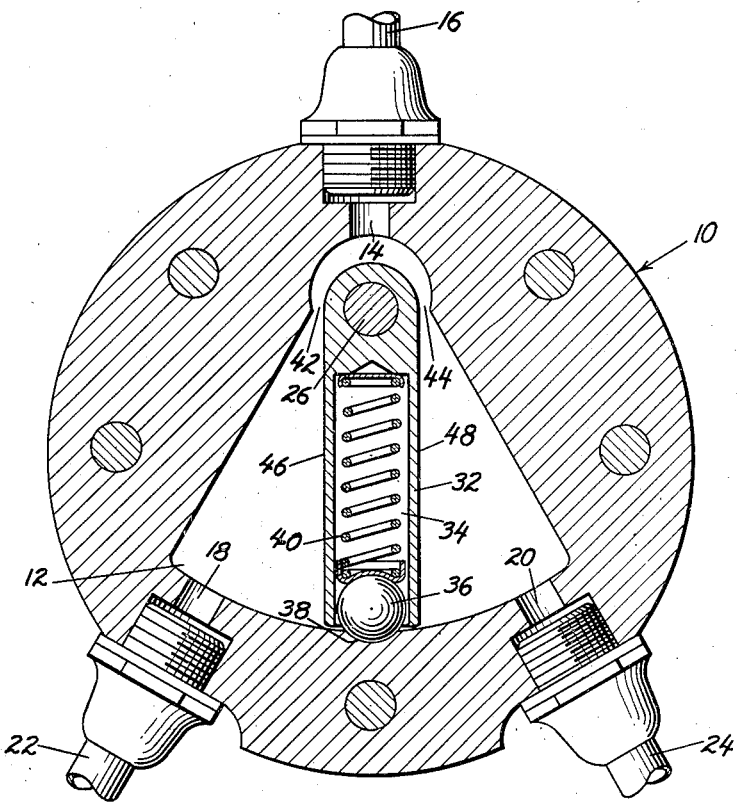
Fig. 1 is a vertical sectional view of a fluid pressure safety device.
Figure 2:
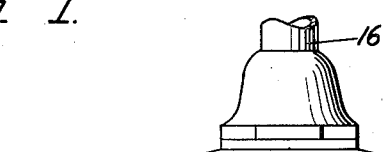
Fig. 2 is a partial front view of the device.
Figure 3:
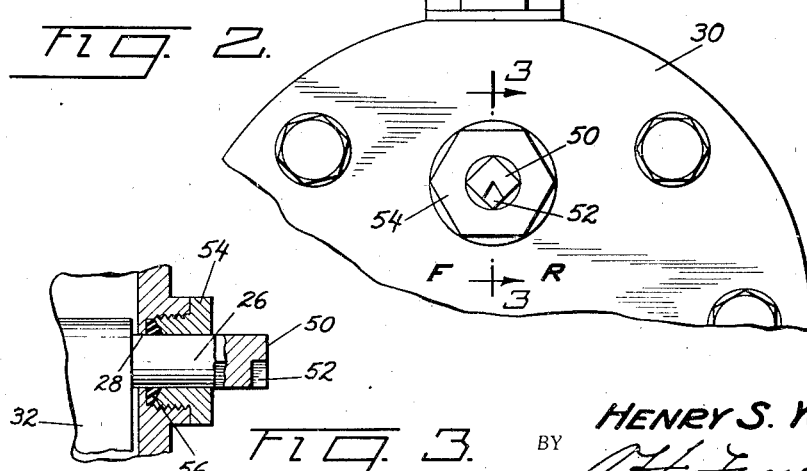
Fig. 3 is a sectional view substantially on line 3—3, of Fig. 2.

Referring to the drawing for more specific details of the invention, a fluid pressure safety device indicated generally at 10 includes a chamber 12 substantially triangular in cross-section having an inlet port 14 connected by a pipe line 16 to a fluid pressure producing device, not shown, and outlet ports 18 and 20 connected by pipe lines 22 and 24 respectively to the front and rear brakes of a motor vehicle, not shown.

A shaft 26 located in the chamber 12 adjacent the inlet port 14 has one end journaled in the body of the safety device 10, and the other end is supported in a bore 28 of a cover 30 bolted or otherwise suitably secured to the body of the device.

A vane 32 fixedly secured at one end to the shaft 26 so as to be pivoted therewith has a bored hole 34 therein for the reception of a ball 36 of slightly less diameter than the hole. A detent or recess 38 in the wall of the chamber 12 diametrically opposite the inlet port 14 and midway between the ports 18 and 20 is adapted to receive the ball 36 when the vane is in a position medially of the ports. A spring 40 interposed in the hole 34 between the ball and base of the hole 34 serves to normally retain the ball in the detent 38 and thereby maintain the vane medially of the ports to serve as a shiftable partition within the chamber. The spring 40 is intended to afford sufficient resistance to prevent movement of the vane under the influence of normal differences in pressure acting on the opposite sides of the vane.

The vane 32 at its pivot end strangulates that portion of chamber 12 communicating directly with port 14, and provides restricted channels 42 and 44 communicating with chamber 12 on respective sides of the vane. This strangulation produces the pressure differential required for operating the vane mechanism. The vane has faces 46 and 48 corresponding respectively to the channels 42 and 44 and the ports 18 and 20.

The end of the shaft 26 journaled in the cover 28 extends externally from the device and is provided with a square head 50 for the reception of a suitable wrench or tool, a notch 52 in the head 54 serves as a pointer or indicator, the purpose of which will hereinafter appear.

A plug 54 threaded in the cover 30 serves as an additional bearing for the shaft 26 and also retains a sealing washer 56 between the plug and cover so as to inhibit seepage of fluid from the device.

Scribed on the cover 30 are the letters F and R, for the purpose of indicating the respective positions of the vane in the chamber 12, corresponding to the position of the notch 52. If, for example, the line leading to the rear brakes of the vehicle was ruptured and the vane had moved to a position closing off the line to the rear brakes, the pointer as represented by the notch 52 would assume a position pointing in the direction of R and would immediately inform the operator of the motor vehicle that the line leading to the rear set of brakes had produced the rupture.

Fluid under pressure delivered to the safety device under normal conditions is conveyed through the chamber 12 and delivered to the respective lines 22 and 24 for delivery to the rear and front brakes of the motor vehicle with the consequent actuation thereof. During this operation the vane 32 remains in its normal position centrally of the ports 18 and 20 because of substantially balanced pressure acting on the faces of the vane respectively adjacent the ports 18 and 20.

If, however, a failure should occur in either the line leading to the rear brakes or the line leading to the front brakes, the pressure acting on the faces of the vane would become unbalanced due to the restrictions to flow of the fluid through the channels 42 and 44, with the consequent movement of the vane to a position closing off the port connected to the line of the brake that failed. The differential pressure acting on any one face of the vane, due to the failure of a brake, is sufficient to move the vane against the resistance offered by the spring 40 in maintaining the ball 36 in the recess 38. As the vane leaves its neutral position, it becomes increasingly unstable, due to the partial closing off of either channel 42 or 44, resulting in a more rapid and positive action of the vane. Upon the movement of the vane to either extreme position corresponding to F or R, the ball 36 sets itself in either port 18 or 20 to thus seal the port from communication with the fluid under pressure delivered to the chamber 12. Hereafter, as fluid under pressure is delivered to the chamber 12, the port leading to the undamaged line will remain open and receive such fluid, whereas the port leading to the damaged line is closed and remains so until repair of the damaged line and the resetting of the vane 32 to its normal mid-portion between the ports 18 and 20. The spring 40 acting on the ball 36 is sufficiently strong to inhibit the seepage of fluid past the ball into the port connected to the damaged line, and to prevent the drawing of air into the chamber 12 from the damaged line when the fluid pressure producing means is released.

After a failure has occurred and the line producing the failure has been repaired, a resetting of the vane 32 to its neutral position is necessary for the operation of the device as a medium for conveying fluid from the lines leading to the inlet port of the device to the lines connected to the respective outlet ports of the device. This resetting is readily accomplished by the use of a suitable wrench corresponding to the square head 50 on the shaft 26. The notch 52 on the head 50 need only be moved from the position either F or R upon failure of a brake line to a point centrally thereof, wherein the vane will again, upon the seating of the ball 36 in the detent 38, be located centrally of the ports 18 and 20.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A safety device comprising a chamber having an inlet port and a pair of outlet ports, a vane pivoted in the chamber, a detent in the wall of the device medially of the outlet ports, and means in the tip of the vane cooperating with the detent to normally position the vane centrally of the outlet ports.

2. A safety device comprising a chamber having an inlet port and outlet ports, means pivoted in the chamber adjacent the inlet ports, spring-tensioned means in the free end of pivoted means, and means in the wall of the device centrally of the outlet ports cooperating with the spring-tensioned means to normally positively resist movement of the pivoted means.

3. A safety device comprising a housing having an inlet port and outlet ports, a vane pivoted therein adjacent the inlet port for closing off either of said outlet ports, and means in the free end of the vane and the wall of the housing cooperating to maintain the vane in a central position within the housing.

4. A safety device comprising a housing having an inlet port and outlet ports, means pivoted within the housing adjacent the inlet port, and spring-pressed means in the pivoted means cooperating with the wall of the housing to normally maintain the pivoted means centrally located in the housing, said spring-pressed means adapted to close off either of the outlet ports upon movement of the pivoted means from its normal position to said outlet port.

5. A safety device comprising a housing having an inlet port and a pair of outlet ports, means pivoted in the housing operative to close off either of said outlets, means for indicating the position of the pivoted means, and means providing for normally locking the pivoted means centrally of the outlets.

6. A safety device comprising a housing having an inlet port and outlet ports, a vane swingably supported within the housing, and a spring-pressed ball positioned internally of the vane for normally maintaining the vane between the outlet ports, said ball adapted to close off either of said outlet ports when the vane swings from its central position to said outlet port.

7. A safety device comprising a housing having an inlet port and outlet ports, means pivoted in the housing, spring-tensioned means normally maintaining the pivoted means between the outlet ports, said pivoted means operative through a differential in fluid pressure at said outlets, and said spring-tensioned means adapted to close off either of the outlet ports after a movement of the pivoted means.

8. A fluid pressure safety device comprising a chamber having an inlet port and outlet ports, a partition element within the chamber intermediate the outlet ports dividing the chamber into two compartments, and means maintaining said element at the intermediate position releasable under differential pressure upon opposite sides to permit shifting of the element toward either outlet port, said means cooperating to close either outlet upon shifting of the element thereto and adapted to maintain said port closed upon release of differential pressure.

9. A fluid pressure safety device comprising a chamber having an inlet port and outlet ports, and a partition member extending within the chamber from a point adjacent the inlet port to a point midway between the outlet ports, said member swingable under differential pressure against its opposite sides and provided with means adapted to close either outlet port.

10. A fluid pressure safety device comprising a chamber having an inlet port and outlet ports, means shiftable within the chamber comprising a spring-pressed ball for controlling said outlet ports, and a wall in the chamber having a portion cooperating with said ball to releasably position the shiftable means within the chamber intermediate said outlet ports.

HENRY S. YOUNG, Jr.